(12) United States Patent
Lim

(10) Patent No.: US 11,711,506 B2
(45) Date of Patent: Jul. 25, 2023

(54) V3C VIDEO COMPONENT TRACK ALTERNATIVES

(71) Applicant: Samsung Electronics Co., Ltd., Suwon-si (KR)

(72) Inventor: Youngkwon Lim, Allen, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 8 days.

(21) Appl. No.: 17/486,648

(22) Filed: Sep. 27, 2021

(65) Prior Publication Data

US 2022/0217318 A1    Jul. 7, 2022

Related U.S. Application Data

(60) Provisional application No. 63/181,056, filed on Apr. 28, 2021, provisional application No. 63/179,744, (Continued)

(51) Int. Cl.
| | |
|---|---|
| *H04N 13/161* | (2018.01) |
| *G06T 9/00* | (2006.01) |
| *H04N 19/597* | (2014.01) |
| *H04N 21/44* | (2011.01) |
| *H04N 21/854* | (2011.01) |

(52) U.S. Cl.
CPC ............ *H04N 13/161* (2018.05); *G06T 9/00* (2013.01)

(58) Field of Classification Search
None
See application file for complete search history.

(56) References Cited

U.S. PATENT DOCUMENTS

| | | |
|---|---|---|
| 2020/0021791 A1 | 1/2020 | Hur et al. |
| 2020/0302632 A1 | 9/2020 | Oh |

(Continued)

FOREIGN PATENT DOCUMENTS

| | | |
|---|---|---|
| WO | 2020145668 A1 | 7/2020 |
| WO | 2020237072 A1 | 11/2020 |
| WO | 2020254720 A1 | 12/2020 |

OTHER PUBLICATIONS

International Search Report and Written Opinion dated Mar. 28, 2022 regarding International Application No. PCT/KR2022/000158, 8 pages.
Choi et al. (Eds.), "Text of ISO/IEC CD 23094-1, Essential Video Coding", ISO/IEC JTC1/SC29/WG11, N18568, Jul. 2019, Gothenburg, Sweden, 292 pages.

(Continued)

*Primary Examiner* — Christopher Braniff

(57) ABSTRACT

An apparatus includes a communication interface and a processor operably coupled to the communication interface. The communication interface receives a plurality of tracks in a compressed bitstream. The processor identifies an atlas track corresponding to a point cloud compression (PCC) component and identifies a set of first component tracks that is referenced by the atlas track and at least one second component track, each of the at least one second component track is an alternative version of a first component track of the set of first component tracks. The processor also determines which of the set of first component tracks and the at least one second component track are appropriate versions of the PCC component. The processor further decodes the appropriate version of the PCC component from among the set of first component tracks and the at least one second component track.

20 Claims, 8 Drawing Sheets

Related U.S. Application Data filed on Apr. 26, 2021, provisional application No. 63/171,369, filed on Apr. 6, 2021, provisional application No. 63/136,265, filed on Jan. 12, 2021, provisional application No. 63/134,006, filed on Jan. 5, 2021.

(56) References Cited

U.S. PATENT DOCUMENTS

2021/0235058 A1 7/2021 Yip et al.
2021/0409767 A1* 12/2021 Oh .................... H04N 19/70

OTHER PUBLICATIONS

Lim, "EVC Slice Track", ISO/IEC JTC 1/SC 29/WG 3, m55182, Online, Oct. 2020, 5 pages.
Lim, "Updates on EVC Slice Track", ISO/IEC JTC 1/SC 29/WG 03, m56029, Online, Jan. 2021, 6 pages.
"Information technology—Coding of audio-visual objects—Part 15: Carriage of network abstraction layer (NAL) unit structured video in the ISO base media file format—Amendment 2: Carriage of VVC and EVC in ISOBMFF", ISO/IEC 14496-15:2019(E) Amendment 2, ISO/IEC JTC 1/SC 29/WG 11, Switzerland, Dec. 2020, 57 pages.
"Information technology—Coding of audio-visual objects—Part 15: Carriage of network abstraction later (NAL) unit structured video in the ISO base media file format", ISO/IEC 14496-15:2021(E), ISO/IEC JTC 1/SC 29/WG 03, Switzerland, Dec. 2020, 282 pages.

* cited by examiner

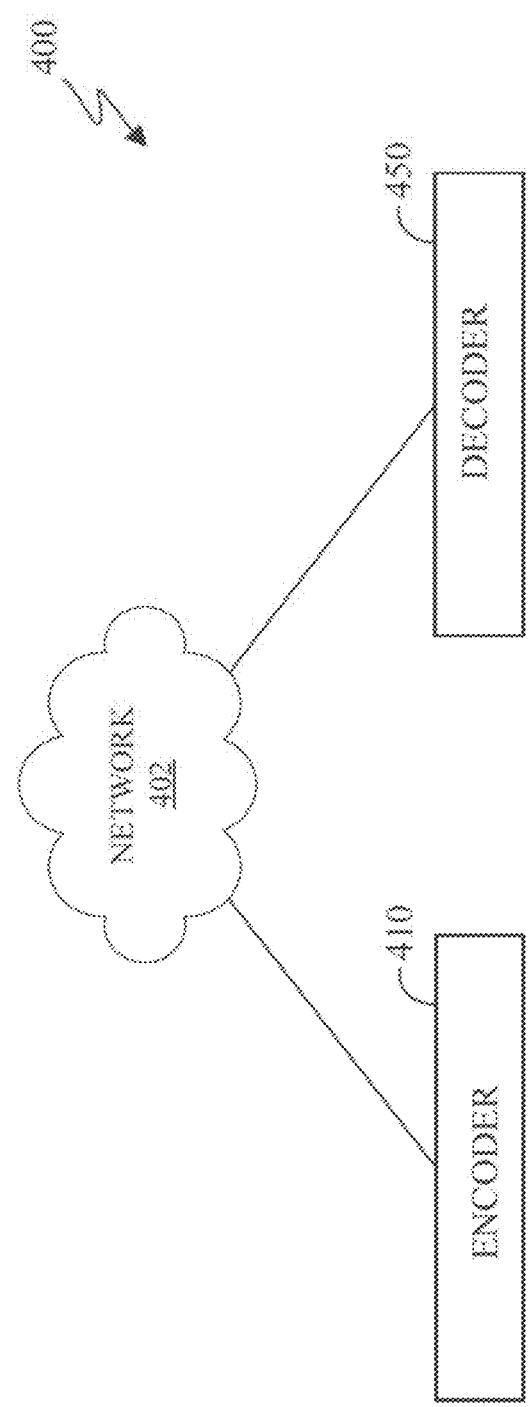

V3C VIDEO COMPONENT TRACK ALTERNATIVES

CROSS-REFERENCE TO RELATED APPLICATION AND PRIORITY CLAIM

This application claims priority under 35 U.S.C. § 119(e) to U.S. Provisional Patent Application No. 63/134,006 filed on Jan. 5, 2021, U.S. Provisional Patent Application No. 63/136,265 filed on Jan. 12, 2021, U.S. Provisional Patent Application No. 63/171,369 filed on Apr. 6, 2021, U.S. Provisional Patent Application No. 63/179,744 filed on Apr. 26, 2021 and U.S. Provisional Patent Application No. 63/181,056 filed on Apr. 28, 2021, which are hereby incorporated by reference in its entirety.

TECHNICAL FIELD

This disclosure relates generally to video processing devices and processes. More specifically, this disclosure relates to visual volumetric video-based coding (V3C) video component track alternatives.

BACKGROUND

ISO/IEC 23090-10 carriage of visual volumetric video-based coding (V3C) data supports alternative representation of V3C video component tracks. However, the use of such features with the combination with a V3C atlas tile track is not fully provided.

SUMMARY

This disclosure provides V3C video component track alternatives.

In a first embodiment, a decoding device includes a communication interface and a processor operably coupled to the communication interface. The communication interface is configured to receive a plurality of tracks in a compressed bitstream. The processor is configured to identify an atlas track corresponding to a point cloud compression (PCC) component and identify a set of first component tracks that is referenced by the atlas track and at least one second component track, each of the at least one second component track is an alternative version of a first component track of the set of first component tracks. The processor is also configured to determine which of the set of first component tracks and the at least one second component track are appropriate versions of the PCC component. The processor is further configured to decode the appropriate version of the PCC component from among the set of first component tracks and the at least one second component track.

In a second embodiment, a decoding device includes a communication interface and a processor operably coupled to the communication interface. The communication interface is configured to receive a dynamic adaptive streaming over HTTP (DASH) media presentation description (MPD) about a point cloud compression (PCC) data and a plurality of tracks in a compressed bitstream. The processor is configured to, based on information in the DASH MPD, identify a first atlas bitstream and a second atlas bitstream that is an alternative version of the first atlas bitstream based on the first atlas bitstream and the second atlas bitstream having a same value of an atlas ID. The processor is also configured to determine which of a first atlas track and a second atlas track is an appropriate version of the PCC data. The processor is further configured to decode the appropriate version of the PCC data.

In a third embodiment, a method includes receiving a plurality of tracks in a compressed bitstream. The method also includes identifying an atlas track corresponding to a point cloud compression (PCC) component and identifying a set of first component tracks that is referenced by the atlas track and at least one second component track, each of the at least one second component track is an alternative version of a first component track of the set of first component tracks. The method further includes determining which of the set of first component tracks and the at least one second component track are appropriate versions of the PCC component. In addition, the method includes decoding the appropriate version of the PCC component from among the set of first component tracks and the at least one second component track.

In a fourth embodiment, an encoder device includes a processor and a communication interface operably coupled to the processor. The processor is configured to encode an atlas track corresponding to a point cloud compression (PCC) component. The processor is also configured to encode the PCC component in a first component track that references the atlas track. The processor is further configured to encode an alternative version of the PCC component from the first component track in a second component track. The communication interface is configured to transmit a compressed bitstream including the atlas track, the first component track, and the second component track.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates a block diagram of an example environment-architecture in accordance with an embodiment of this disclosure;

DETAILED DESCRIPTION

FIGS. 1 through 6, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

Alternative content representation is defined in ISO/IEC 23090-10 Carriage of Video-based Point Cloud Compression Data in a very high level. 1.1.1.1 V3C content alternatives provide that V3C content may be encoded as different versions in the file format. Different alternatives are indicated by the alternative tracks mechanism defined in ISO/IEC 14496-12 (i.e., altenate_group field of the TrackHeaderBox). V3C atlas tracks which have the same alternate_group value shall be different versions of the same V3C content.

1.1.1.2 V3C video component alternatives provides that V3C video component tracks may have alternatives. In such a case, only ne of the V3C video component tracks that belong to an alternative group shall be referenced by the V3C atlas track or V3C atlas tile track. V3C video component tracks which are alternatives of each other should use the alternate grouping mechanism, as defined in ISO/IEC 14496-12.

As a single content of V-PCC is composed of many components and combination of components that can widely vary. A detailed description about complicated or complex cases needs further defining. When a V3C content has alternatives, a sample entry of a track belongs to all V3C contents in an alternative relationship that may not provide enough information to show the differences between alternative versions. The application may use additional external mechanisms, e.g., dynamic adaptive streaming over HTTP (DASH) media presentation description (MPD), scene descriptions, etc., to get information to select one appropriate version for display.

Figure 1:
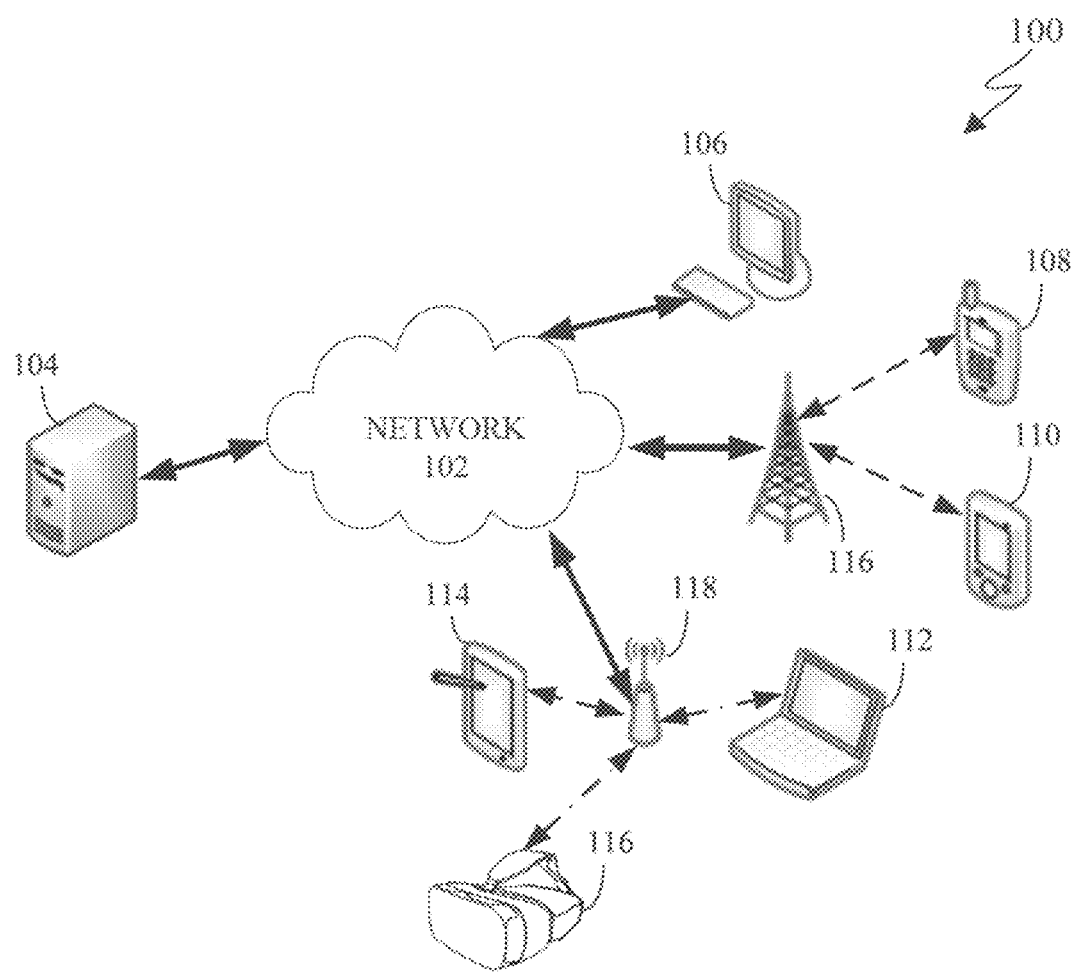
FIG. 1 illustrates an example communication system in accordance with an embodiment of this disclosure.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 can then compress 3D point cloud to generate a bitstream and then transmit the bitstream to one or more of the client devices 106-116. For another example, one of the client devices 106-116 can compress a 3D point cloud to generate a bitstream and then transmit the bitstream to another one of the client devices 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
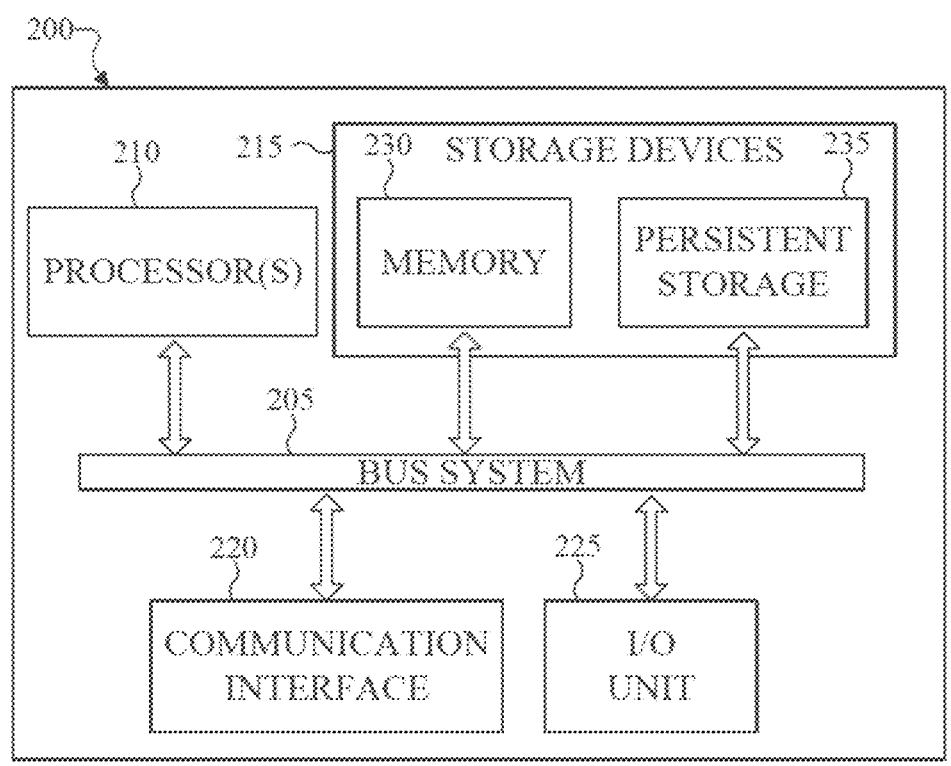
FIGS. 2 and 3 illustrate example electronic devices in accordance with an embodiment of this disclosure.
Figure 3:
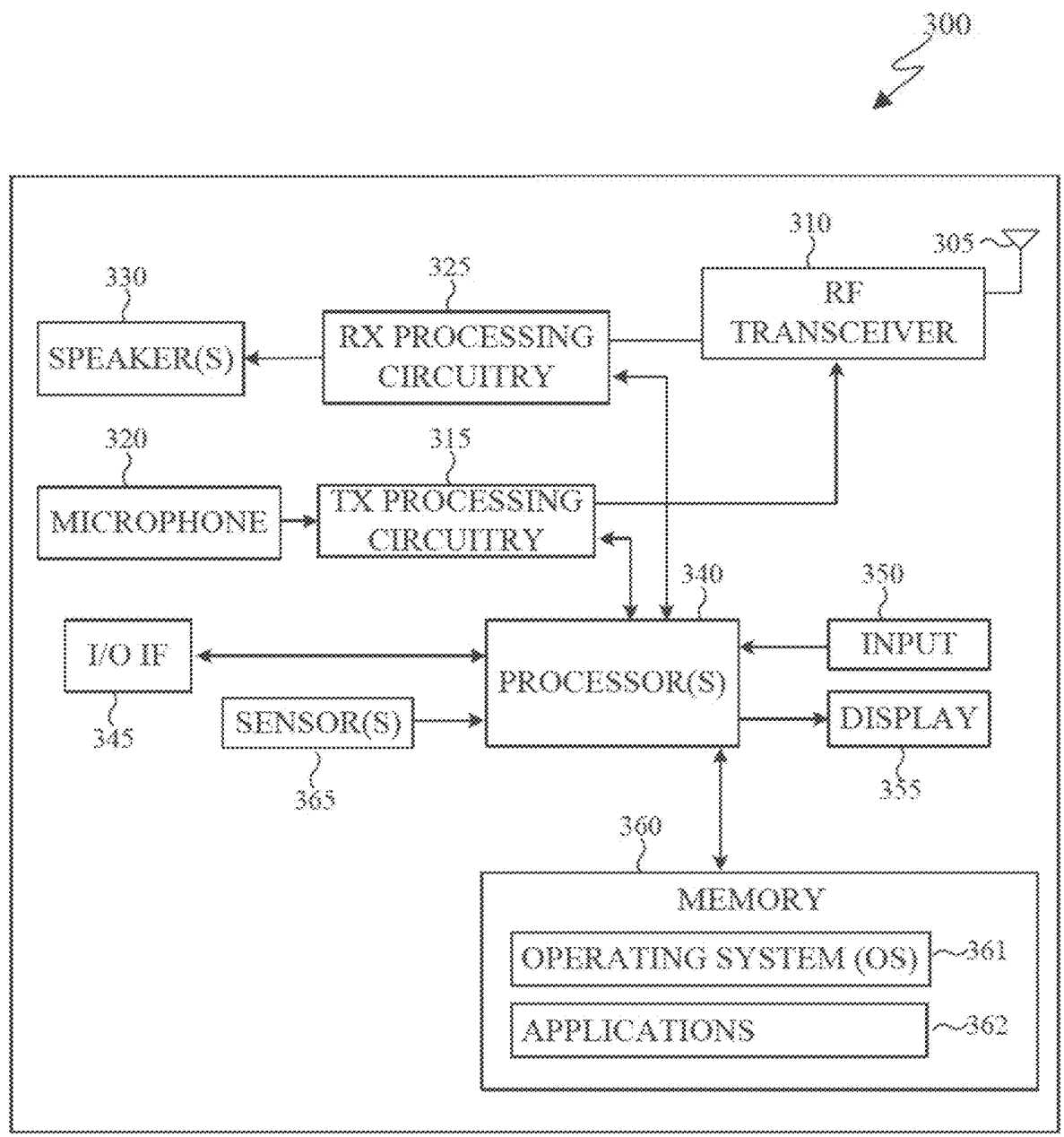

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 includes a bus system 205 that supports communication between at least one processing device (such as a processor 210), at least one storage device 215, at least one communications interface 220, and at least one input/output (I/O) unit 225. The server 200 can represent one or more local servers, one or more compression servers, or one or more encoding servers, such as an encoder. In certain embodiments, the encoder can perform decoding.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, encoding a 3D point cloud also decodes the 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for encode an atlas track corresponding to a PCC component, instructions for encoding the PCC component in a first component track that references the atlas tracks, instructions for encoding an alternative version of the PCC component from the first component track in a second component track, as well as instructions for transmitting a compressed bitstream including the atlas track, the first component track, and the second component track.

The instructions stored in the memory 230 can also include instructions for receiving a plurality of tracks in a compressed bitstream, instructions for identifying an atlas track corresponding to a PCC component, instructions for identifying a set of first component tracks that is referenced by the atlas track and at least one second component track, instructions for determining which of the set of first component tracks and the at least one second component track are appropriate versions of the PCC component; and instructions for decoding the appropriate version of the PCC component from among the set of first component tracks and the at least one second component tracks. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device.

Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

The electronic device 300 can encode an atlas track corresponding to a PCC component. The electronic device 300 can encode the PCC component in a first component track that references the atlas track. The electronic device 300 can encode an alternative version of the PCC component from the first component track in a second component track. The electronic device 300 can transmit a compressed bitstream including the atlas track, the first component track, and the second component track. The electronic device 300 can encode the media content to generate a bitstream, such that the bitstream can be transmitted directly to another electronic device or indirectly such as through the network 102 of FIG. 1. Another electronic device, similar to the electronic device 300, can receive a bitstream directly from the electronic device 300 or indirectly such as through the network 102 of FIG. 1.

Similarly, when decoding media content included in a bitstream that represents a 3D point cloud, the electronic device 300 receives a compressed bitstream. In certain embodiments, the electronic device 300 can identify an atlas track corresponding to a PCC component. The electronic device 300 can identify a set of first component tracks that is referenced by the atlas track and at least one second component track, where each of the at least one second component track is an alternative version of a first component track of the set of first component tracks. The electronic device 300 can determine which of the set of first component tracks and the at least one second component tracks are appropriate versions of the PCC component. The electronic device 300 can decode the appropriate version of the PCC component from among the set of first component tracks and the at least one second component track. In certain embodiments, after reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

FIG. 4 illustrates a block diagram of an example environment-architecture 400 for storage of V3C video component alternatives in accordance with an embodiment of this disclosure. The embodiment of FIG. 4 is for illustration only. Other embodiments can be used without departing from the scope of this disclosure.

As shown in FIG. 4, the example environment-architecture 400 includes an encoder 410 and a decoder 450 in communication over a network 402. The network 402 can be the same as or similar to the network 102 of FIG. 1. In certain embodiments, the network 402 represents a "cloud" of computers interconnected by one or more networks, where the network is a computing system utilizing clustered computers and components that act as a single pool of seamless resources when accessed. Also, in certain embodiments, the network 402 is connected with one or more servers (such as the server 104 of FIG. 1, the server 200), one or more electronic devices (such as the client devices 106-116 of FIG. 1, the electronic device 300), the encoder 410, and the decoder 450. Further, in certain embodiments, the network 402 can be connected to an information repository (not shown) that contains media content that can be encoded by the encoder 410, decoded by the decoder 450, or rendered and displayed on an electronic device.

In certain embodiments, the encoder 410 and the decoder 450 can represent the server 104, one of the client devices 106-116 of FIG. 1, or another suitable device. The encoder 410 and the decoder 450 can include internal components similar to the server 200 of FIG. 2 and electronic device 300 of FIG. 3. In certain embodiments, the encoder 410 and the decoder 450 can be a "cloud" of computers interconnected by one or more networks, where each is a computing system utilizing clustered computers and components to act as a single pool of seamless resources when accessed through the network 402. In some embodiments, a portion of the components included in the encoder 410 or the decoder 450 can be included in different devices, such as multiple servers 104 or 200, multiple client devices 106-116, or other combination of different devices. In certain embodiments, the encoder 410 is operably connected to an electronic device or a server while the decoder 450 is operably connected to an electronic device. In certain embodiments, the encoder 410 and the decoder 450 are the same device or operably connected to the same device.

The encoder 410 receives media content from another device such as a server (similar to the server 104 of FIG. 1, the server 200 of FIG. 2) or an information repository (such as a database). The encoder 410 can encode an atlas track corresponding to a PCC component, encode the PCC component in a first component track that references the atlas track, encode an alternative version of the PCC component from the first component track in a second component track, and transmit a compressed bitstreams including the atlas track, the first component track, and the second component track. The encoder 410 transmits frames representing the media content as an encoded bitstream. The bitstream can be transmitted to an information repository (such as a database) or an electronic device that includes a decoder (such as the decoder 450), or the decoder 450 itself through the network 402.

The decoder 450 can receive a bitstream that represents media content. In certain embodiments, the decoder 450 can identify an atlas track corresponding to a PCC component, identify a set of first component tracks that is referenced by the atlas track and at least one second component track, where each of the at least one second component track is an alternative version of a first component track of the set of first component tracks, determine which of the set of first component tracks and the at least one second component tracks are appropriate versions of the PCC component, and decode the appropriate version of the PCC component from among the set of first component tracks and the at least one second component track.

Although FIG. 4 illustrates examples of an encoder and a decoder, various changes can be made to FIG. 4. For example, various components in FIG. 4 could be combined, further subdivided, or omitted and additional components could be added according to particular needs. As a particular example, the encoder 410 or decoder 450 could be divided into multiple components. In addition, as with computing and communication, encoders and decoders can come in a wide variety of configurations, and FIG. 4 does not limit this disclosure to any particular encoder or decoder.

Figure 5A:
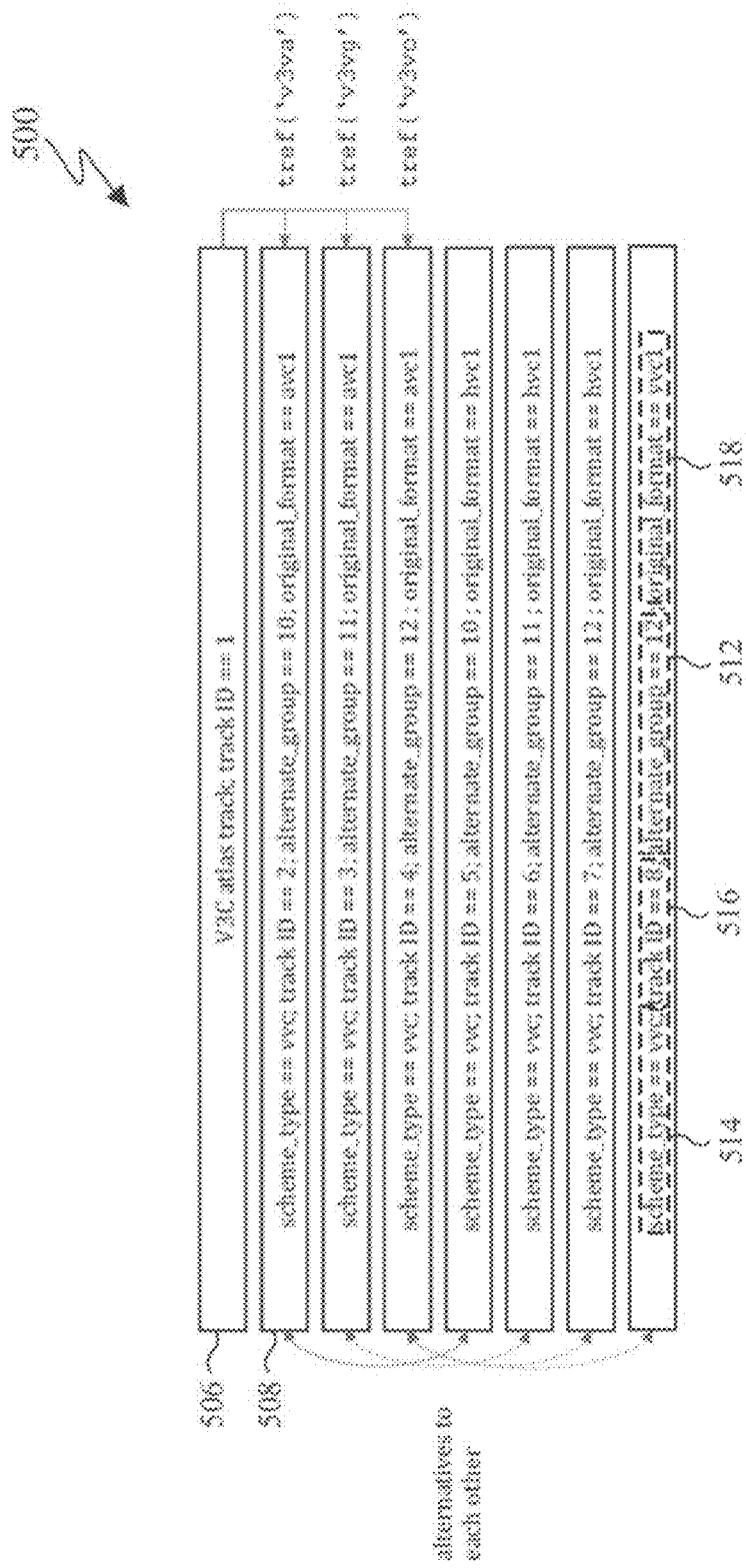
FIGS. 5A-5C illustrates an example files in accordance with this disclosure.
Figure 5B:
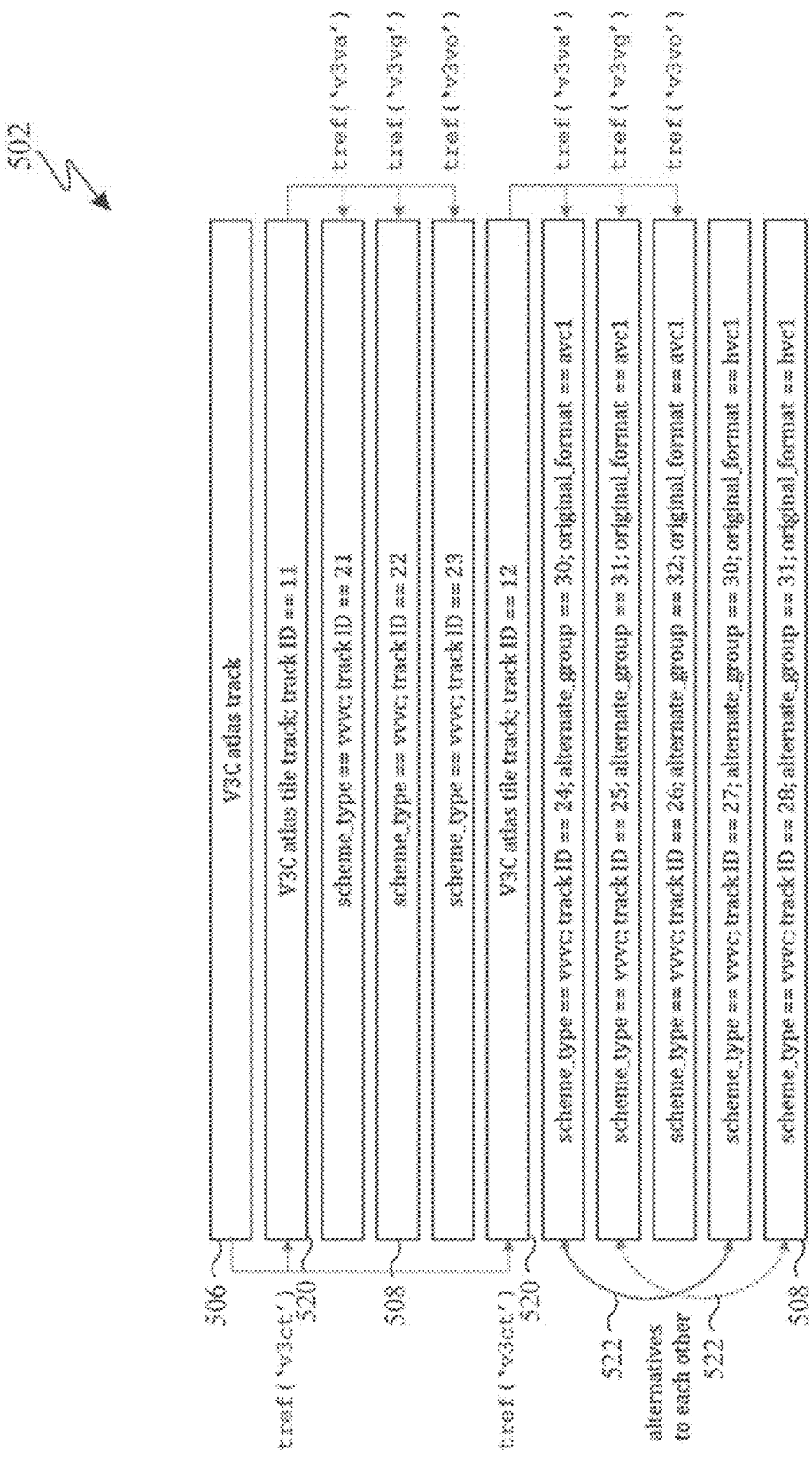
Figure 5C:
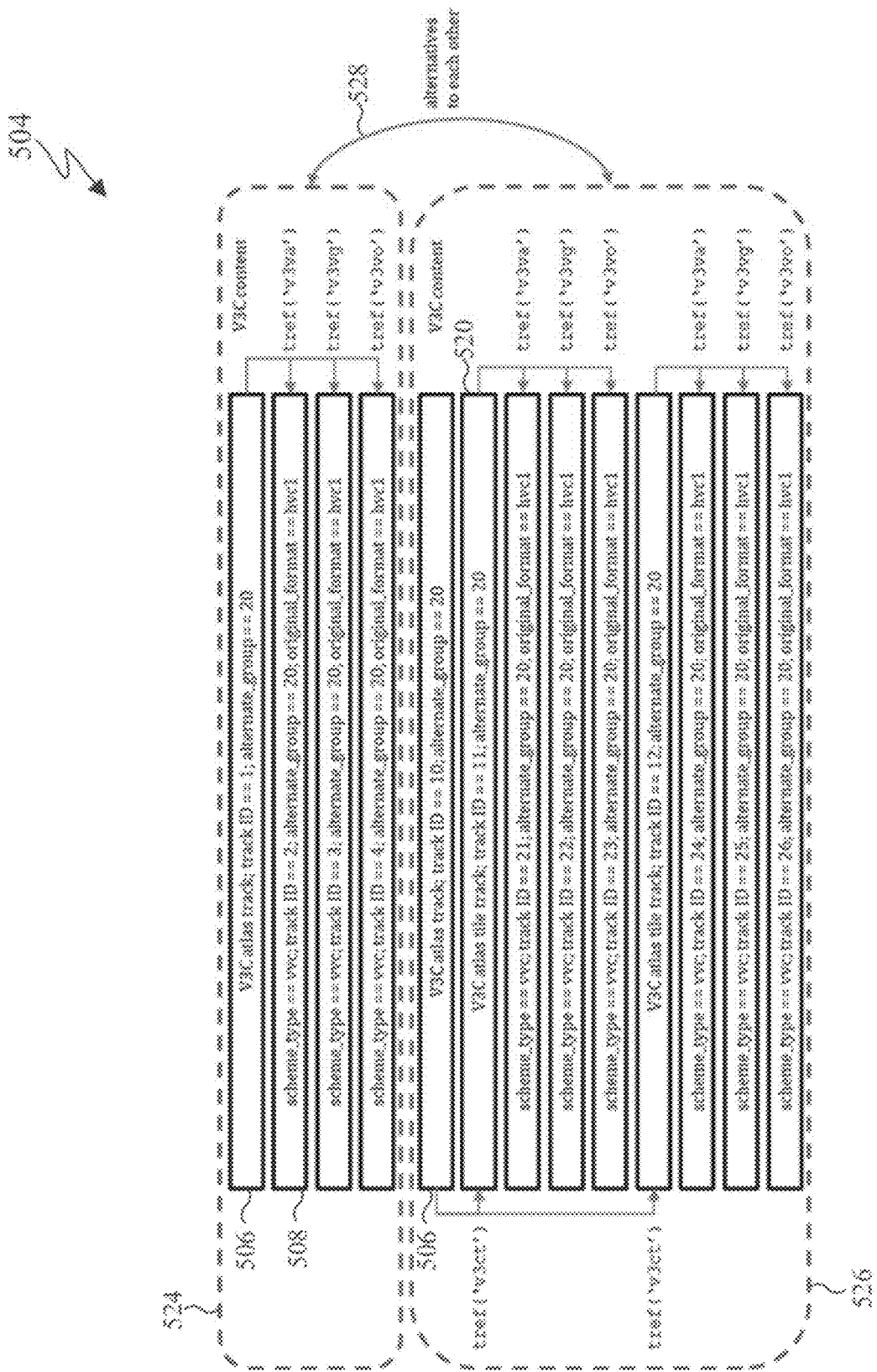

FIGS. 5A through 5C illustrates an example files 500, 502, 504 in accordance with this disclosure. In particular, FIG. 5A illustrates file 500, FIG. 5B illustrates file 502, and FIG. 5C illustrates file 504. The embodiments of the files 500, 502, 504 illustrated in FIGS. 5A through 5C are for illustration only. FIGS. 5A through 5C do not limit the scope of this disclosure to any particular implementation of an electronic device.

As shown in FIGS. 5A through 5C, the file 500 can include at atlas track 506 and a plurality of component tracks 508. More than one version of a component can be stored in a video-based PCC (V-PCC) file 500. Decoding can begin from at an atlas track 506 and the file 500 can include a combination of atlas tracks 506 and component tracks 508. An atlas track 506 is a first track read for processing of a PCC component. For decoding a PCC component, an atlas track 506 and the corresponding component tracks 508 associated with the atlas track 506 are decoded. The term "atlas" can be interchangeable with "patches". A single atlas track 506 can be used per V-PCC objects, where an atlas track 506 includes a group of patches. A file 500 can include multiple atlas tracks 506 when atlas tracks 506 contain totally different objects or differently encoded versions of an object.

Track alternatives are indicated by the alternate track mechanism defined in ISO/IEC 14496-12 (i.e., alternate_group field of the TrackHeaderBox). V3C content can have many versions. In certain embodiments, tracks including V3C contents in alternative relationship have the same alternate_group value 512 in their TrackHeaderBox. A single V3C content may have alternative representation of V3C video components. V3C video component tracks 508 that have the same alternate_group value 512 are different representations of the same V3C video component.

When V3C content has alternatives, more than two V3C contents in an alternative relationship are not to be played together, which means that one of the two V3C contents does not need to be processed. All V3C video component tracks 508 that include V3C contents in alternative relationship shall be referenced by one and only one V3C atlas track or V3C atlas tile track. When V3C content have alternatives in a file 500, a sample entry of component tracks 508 belonging to the V3C content in alternative relationships may not provide enough information to show the differences between the alternative versions. The application may use additional external mechanisms, e.g. DASH MPD, scene descriptions, and so on, to get information to select one appropriate version for play.

When a V3C video component track 508 has alternatives versions, only one of the V3C video component tracks 508 that belong to a same alternative group is referenced by the V3C atlas track 506 or V3C atlas tile track 520. V3C video component tracks 508 not directly referenced by the V3C atlas track 506 or V3C atlas tile track 520 are also represented as restricted video and have a generic restricted sample entry 'resv' with additional requirements. When a V3C video component track 508 has alternatives, a sample entry of each alternative component track 508 provides enough information to show the differences between the alternative representations in order to select one appropriate representation for playing by the application.

FIG. 5A shows an example of a V3C content using track alternatives of V3C video components tracks 508. A scheme type value 514 for the component tracks 508 with a track ID value 516 within the range of 2 and 8, 'vvvc' indicates they are the V3C video components tracks. The component tracks 508 with a track ID value 516 of 2, 3, and 4 are known as the V3C video component track 508 related to the V3C atlas track 506 with track ID value 516 of 1. The relationship between the components tracks 508 related to the atlas track 506 is included in information of the atlas track 506 that directly lists the component track 508. Even though the component tracks 508 with track ID values 516 of 5, 6, 7, and 8 are not directly listed, these component tracks 508 are also identified as V3C video component tracks 508 related to the same V3C atlas track 506 by having same alternative group value 512 of track alternative group information with the component tracks 508 with track ID values 516 of 2, 3, and 4. The component tracks 508 with the alternate group values 512 of 10, 11, and 12, respectively, are the alternative representations for the same components of V3C content. The original format value 518 in RestrictedSchemeInfoBox shows that the component tracks 508 with a track ID value 516 of 2, 3, and 4 are AVC encoded representations and the component tracks 508 with track ID values 516 of 5, 6, and 7 are HEVC encoded alternative representations of the component tracks 508 with track ID value of 2, 3 and 4, respectively. The original format value 518 in RestrictedSchemeInfoBox shows that the component tracks 508 with a track ID value 516 of 8 is a VVC encoded alternative representation of the component tracks 508 with a track ID value 516 of 4 and 7.

As shown in FIG. 5B, file 502 includes V3C content that uses track alternatives of V3C video components tracks 508 with V3C atlas tile tracks 520. The scheme type value 514 of the component tracks 508 with track ID values 516 within the range between 21 and 28 are set to 'vvvc', which indicates the component tracks 508 are V3C video components tracks. The track reference information in the V3C atlas tile tracks 520 show that the component tracks 508 with track ID values 516 of 21, 22 and 23 are V3C video components tracks 508 related to V3C atlas tile track 520 with a track ID value 516 of 11 and the component tracks 508 with track ID values 516 within the range between 24, 25 and 26 are V3C video components tracks 508 related to V3C atlas tile track 520 with track ID value 516 of 12. Based on the alternate group value 512, the component tracks 508 with track ID values 516 of 27 and 28 are identified as the alternative representation 522 of the component track 508 with a track ID value 516 of 24 and 25, respectively, which means that they are also the V3C component tracks 508 related to the V3C atlas track 506 with track ID value 516 of 12. The original format value 518 in RestrictedSchemeInfoBox shows that the component tracks 508 with a track ID value of 24 and 25 are AVC encoded representations and the component tracks 508 with a track ID value 516 of 27 and 28 are HEVC encoded alternative representations 522 of the component tracks 508 with a track ID value 516 of 24 and 25, respectively.

As shown in FIG. 5C, file 504 includes V3C contents that can have alternative representations 522. The component tracks 508 with track ID values 516 in the range between 1 and 4 comprises one V3C content and the component tracks 508 with track ID value 516 in the range between 10 and 18 comprises other V3C content. Two V3C atlas tracks 506 with a same alternative group value 512 indicates that the V3C contents included in each of the V3C atlas tracks 506 are alternatives to each other. In certain embodiments, the V3C content with V3C atlas track 506 with a track ID value 516 of 1 is a version that does not use the V3C atlas tile mechanism. The V3C content with V3C atlas track 506 with a track ID value 516 of 10 is a version that uses the V3C atlas tile mechanism. For the V3C video component tracks 508, the scheme type value 514 of the component tracks 508 is 'vvvc.' The V3C video component tracks 508 are directly referenced by either V3C atlas track 506 or V3C atlas tile tracks 520. The track reference information in the V3C atlas tracks 506 with a track ID value of 1 shows that the component tracks 508 with track ID values 516 of 2, 3 and 4 are the V3C video components tracks 508 in the atlas track 506. The track reference information in the V3C atlas tile tracks 520 show that the component tracks 508 with a track ID value 516 of 13, 14 or 15 are the V3C video components tracks related to V3C atlas tile track 520 with a track ID value 516 of 11 and the component tracks 508 with track ID values 516 of 16, 17 or 18 are the V3C video components tracks 508 related to V3C atlas tile track 520 with a track ID value 516 of 12. All the V3C video component tracks 508 are referenced by a single V3C atlas track 506 or a single V3C atlas tile track 520.

For DASH MPD with video component alternatives, the value of @codecs parameter of the AdapationSet element for each video components shall be set to 'resv.vvvc.XXXX', where XXXX corresponds to the four-character code (4CC) of the video codec from the original format value 518 in RestrictedSchemeInfoBox of Sample Entry (e.g., 'avc1' or 'hvc1').

For DASH MPD, v3c:@atlas_id and VideoComponent@atlas_id, the parameter indicates the atlas id of the component track 508 carried by the adaptation set, which is present if multiple versions of the same volumetric media are signalled in separate adaptation sets, i.e. V3C content alternatives are presented, and video components associated to each versions of the are also signalled in separate adaptation sets.

As shown in FIG. 5C, file 504 includes two V3C contents that have alternative representations 522. There are thirteen adaptation sets. As adaptation set 524 does not have atlas tile encoding and adaptation set 526 does has atlas tile, the adaptation sets 524, 526 are encoded as alternatives 528. However, adaptation sets 524 and 526 are defined as individual adaptation sets. Two atlas tile tracks are also defined as individual adaptation sets as they are alternatives each other. As the video component tracks 508 associated to the atlas track 506 without atlas tile encoding in adaptation set 524 are alternatives 528 to the video components tracks 508 associated to the atlas track 520 with atlas tile encoding in adaptation set 526. All three component tracks 508 are defined as individual adaptation sets. All video component tracks 508 associated with atlas tile tracks 520 are defined as individual adaptation sets. Atlas tile preselection is used to indicate alternative relationship of video components associated each atlas tile tracks 520. A same value of vID is assigned to both atlas tracks 506 as they are representing same V3C content and alternative each other. The atlasId parameter is provided to each adaptation sets for atlas tracks as they are alternative relationship each other. As the video component tracks are part of different versions of V3C content, adaptation sets for the video component tracks also have an atlas Id parameter to reference an associated atlas track so that relationship of video component tracks and atlas track can be known.

```
<?xml version="1.0" encoding="UTF-8"?>
<MPD
    xmlns="urn:mpeg:dash:schema:mpd:2011"
    xmlns:v3c="urn:mpeg:mpegI:v3c:2020"
    type="static"
    mediaPresentationDuration="PT10S"
    minBufferTime="PT1S"
    profiles="urn:mpeg:dash:profile:isoff-on-demand:2011">
    <Period>
        <!-- Main V3C AdaptationSet -->
        <AdaptationSet id="1" codecs="v3c1">
            <!-- V3C Descriptor -->
            <EssentialProperty schemeIdUri="urn:mpeg:mpegI:v3c:2020:v3c" Id="1" atlasId="1" />
            <Representation id="1">
                ...
            </Representation>
        </AdaptationSet>
        <!-- Atlas Adaptation Set 1 -->
        <AdaptationSet id="2" codecs="v3c1">
            <!-- V3C Descriptor -->
            <EssentialProperty schemeIdUri="urn:mpeg:mpegI:v3c:2020:v3c" vId="1" atlasId="2" />
            <Representation id="2">
```

```
    ...
    </Representation>
</AdaptationSet>
<!-- Atlas Tile Adaptation Set 1 -->
<AdaptationSet id="3" codecs="v3t1">
  <EssentialProperty schemeIdUri="urn:mpeg:dash:preselection:2016" />
  <EssentialProperty schemeIdUri="urn:mpeg:mpegI:v3c:2020:v3c" tiles="1 2 3" />
  <Representation dependencyId="2">
      ...
  </Representation>
</AdaptationSet>
<!-- Atlas Tile Adaptation Set 2 -->
<AdaptationSet id="4" codecs="v3t1">
  <EssentialProperty schemeIdUri="urn:mpeg:dash:preselection:2016" tiles="4 5 6"/>
  <Representation dependencyId="2">
      ...
  </Representation>
</AdaptationSet>
<!-- Occupancy -->
<AdaptationSet id="5" mimeType="video/mp4" codecs="resv.vvvc.hvc1">
  <EssentialProperty schemeIdUri="urn:mpeg:dash:preselection:2016" />
  <EssentialProperty schemeIdUri="urn:mpeg:mpegI:v3c:2020:videoComponent">
      <v3c:videoComponent type="occp" atlasId="1" />
  </EssentialProperty>
  <Representation>
      ...
  </Representation>
</AdaptationSet>
<AdaptationSet id="6" mimeType="video/mp4" codecs="resv.vvvc.hvc1">
  <EssentialProperty schemeIdUri="urn:mpeg:dash:preselection:2016" />
  <EssentialProperty schemeIdUri="urn:mpeg:mpegI:v3c:2020:videoComponent">
      <v3c:videoComponent type="occp" atlasId="2" />
  </EssentialProperty>
  <Representation>
      ...
  </Representation>
</AdaptationSet>
<AdaptationSet id="7" mimeType="video/mp4" codecs="resv.vvvc.hvc1">
  <EssentialProperty schemeIdUri="urn:mpeg:dash:preselection:2016" />
  <EssentialProperty schemeIdUri="urn:mpeg:mpegI:v3c:2020:videoComponent">
      <v3c:videoComponent type="occp" atlasId="2" />
  </EssentialProperty>
  <Representation>
      ...
  </Representation>
</AdaptationSet>
<!-- Geometry -->
<AdaptationSet id="8" mimeType="video/mp4" codecs="resv.vvvc.hvc1">
  <EssentialProperty schemeIdUri="urn:mpeg:dash:preselection:2016" />
  <EssentialProperty schemeIdUri="urn:mpeg:mpegI:v3c:2020:videoComponent">
      <v3c:videoComponent type="geom" atlasId="1" />
  </EssentialProperty>
  <Representation>
      ...
  </Representation>
</AdaptationSet>
<AdaptationSet id="9" mimeType="video/mp4" codecs="resv.vvvc.hvc1">
  <EssentialProperty schemeIdUri="urn:mpeg:dash:preselection:2016" />
  <EssentialProperty schemeIdUri="urn:mpeg:mpegI:v3c:2020:videoComponent">
      <v3c:videoComponent type="geom" atlasId="2" />
  </EssentialProperty>
  <Representation>
      ...
  </Representation>
</AdaptationSet>
<AdaptationSet id="10" mimeType="video/mp4" codecs="resv.vvvc.hvc1">
  <EssentialProperty schemeIdUri="urn:mpeg:dash:preselection:2016" />
  <EssentialProperty schemeIdUri="urn:mpeg:mpegI:v3c:2020:videoComponent">
      <v3c:videoComponent type="geom" atlasId="2" />
  </EssentialProperty>
  <Representation>
      ...
```

```
        </Representation>
    </AdaptationSet>
    <!-- Attribute -->
    <AdaptationSet id="11" mimeType="video/mp4" codecs="resv.vvvc.hvc1">
        <EssentialProperty schemeIdUri="urn:mpeg:dash:preselection:2016" />
        <EssentialProperty schemeIdUri="urn:mpeg:mpegI:v3c:2020:videoComponent">
            <v3c:videoComponent type="attr" atlasId="1" />
        </EssentialProperty>
        <Representation>
            ...
        </Representation>
    </AdaptationSet>
    <AdaptationSet id="12" mimeType="video/mp4" codecs="resv.vvvc.hvc1">
        <EssentialProperty schemeIdUri="urn:mpeg:dash:preselection:2016" />
        <EssentialProperty schemeIdUri="urn:mpeg:mpegI:v3c:2020:videoComponent">
            <v3c:videoComponent type="attr" atlasId="2" />
        </EssentialProperty>
        <Representation>
            ...
        </Representation>
    </AdaptationSet>
    <AdaptationSet id="13" mimeType="video/mp4" codecs="resv.vvvc.hvc1">
        <EssentialProperty schemeIdUri="urn:mpeg:dash:preselection:2016" />
        <EssentialProperty chemeIdUri="urn:mpeg:mpegI:v3c:2020:videoComponent">
            <v3c:videoComponent type="attr" atlasId="2" />
        </EssentialProperty>
        <Representation>
            ...
        </Representation>
    </AdaptationSet>
    <!-- Atlas Tile Preselections -->
    <Preselection id="1" tag="1" preselectionComponents="2 6 9 12" codecs="v3t1">
        <!-V3C Descriptor -->
        <EssentialProperty schemeIdUri="urn:mpeg:mpegI:v3c:2020:v3c" vId="1" />
    </Preselection>
    <Preselection id="2" tag="2" preselectionComponents="3 7 10 13" codecs="v3t1">
        <!-V3C Descriptor -->
        <EssentialProperty schemeIdUri="urn:mpeg:mpegI:v3c:2020:v3c" Id="1" />
    </Preselection>
</Period>
</MPD>
```

For DASH MPD, v3c:@alt_id and VideoComponent@alt_id, the parameter indicating an alternative version of a V3C content carried by the adaptation set is present if multiple versions of same volumetric media are signalled in separate adaptation sets. For example when V3C content alternatives are presented, video components associated to each versions of the are also signalled in separate adaptation sets. Below is Table 1 for elements and attributes for the V3C video component descriptor.

TABLE 1

Elements and attributes for the V3C video component descriptor.

| Elements and attributes | Use | Data type | Description |
| --- | --- | --- | --- |
| videoComponent@alt_id | CM | xs:integer | Indicates the id of the alternative representation of a V3C Content the component represented by the Adaptation Set is comprising. This attribute shall be present if multiple versions of same volumetric media are signalled in separate Adaptation Sets and video components associated to each versions of the are also signalled in separate Adaptation Sets. |

Key:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

Below is Table 2 for attributes for the V3C descriptor.

TABLE 2

Attributes for the V3C descriptor

| Attributes | Use | Data type | Description |
|---|---|---|---|
| v3c:@alt_id | CM | xs:integer | Indicates the id of the alternative representation of a V3C Content the atlas represented by the Adaptation Set is comprsing. This attribute shall be present if multiple versions of same volumetric media are signalled in separate Adaptation Sets |

Key:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

This embodiment describes the case of file 504 with two V3C contents in alternative relationship as depicted in FIG. 5C. There are thirteen adaptation sets. There are two atlas adaptation sets. The same value of vID is assigned to both atlas tracks 506 as they are representing the same V3C content and are alternatives to each other. As the tile track without atlas tile encoding and the tile track with atlas tile encoding are alternatives to each other, the tile tracks are defined as individual adaptation sets and different values are assigned to the @alt_id attribute. Two atlas tile tracks are also defined as individual adaptation sets as they are alternatives each other. The Alternative relationship of the atlas tile adaptation sets are indicated by having same value of @dependencyId. As the video component tracks associated to the atlas track without atlas tile encoding are alternatives to the video components tracks associated to the atlas track with atlas tile encoding, video component tracks are defined as individual adaptation sets. As the video component tracks are part of different version of V3C content, adaptation sets for the video component tracks also have alt_id parameter to reference atlas track associated with so that relationship of video component tracks and atlas track can be known. All video component tracks associated with atlas tile tracks are defined as individual adaptation sets. For the representation atlas tile encoding is used, more than one video components with same @type value are assigned with same value of @alt_id. Preselection is provided to describe the relationship between the atlas tile adaptation sets and the video component adaptation sets.

```
<?xml version="1.0" encoding="UTF-8"?>
<MPD
    xmlns="urn:mpeg:dash:schema:mpd:2011"
    xmlns:v3c="urn:mpeg:mpegI:v3c:2020"
    type="static"
    mediaPresentationDuration="PT10S"
    minBufferTime="PT1S"
    profiles="urn:mpeg:dash:profile:isoff-on-demand:2011">
<Period>
    <!-- Main V3C AdaptationSet -->
    <AdaptationSet id="1" codecs="v3c1">
        <!-- V3C Descriptor -->
        <EssentialProperty schemeIdUri="urn:mpeg:mpegI:v3c:2020:v3c" vId="1" alt_id="1" />
        <Representation id="1">
            ...
        </Representation>
    </AdaptationSet>
    <!-- Atlas Adaptation Set 1 -->
    <AdaptationSet id="2" codecs="v3c1">
        <!-- V3C Descriptor -->
        <EssentialProperty schemeIdUri="urn:mpeg:mpegI:v3c:2020:v3c" vId="1" alt_id ="2" />
        <Representation id="2">
            ...
        </Representation>
    </AdaptationSet>
    <!-- Atlas Tile Adaptation Set 1 -->
    <AdaptationSet id="3" codecs="v3t1">
        <EssentialProperty schemeIdUri="urn:mpeg:dash:preselection:2016" />
        <EssentialProperty schemeIdUri="urn:mpeg:mpegI:v3c:2020:v3c" tile_ids="1 2 3" />
        <Representation dependencyId="2">
            ...
        </Representation>
    </AdaptationSet>
    <!-- Atlas Tile Adaptation Set 2 -->
    <AdaptationSet id="4" codecs="v3t1">
        <EssentialProperty schemeIdUri="urn:mpeg:dash:preselection:2016" />
        <EssentialProperty schemeIdUri="urn:mpeg:mpegI:v3c:2020:v3c" tile_ids="4 5 6"/>
```

```xml
        <Representation dependencyId="2">
            ...
        </Representation>
    </AdaptationSet>
    <!-- Occupancy -->
    <AdaptationSet id="5" mimeType="video/mp4" codecs="resv.vvvc.hvc1">
        <EssentialProperty schemeIdUri="urn:mpeg:dash:preselection:2016" />
        <EssentialProperty
schemeIdUri="urn:mpeg:mpegI:v3c:2020:videoComponent">
            <v3c:videoComponent type="occp" alt_id ="1" />
        </EssentialProperty>
        <Representation>
            ...
        </Representation>
    </AdaptationSet>
    <AdaptationSet id="6" mimeType="video/mp4" codecs="resv.vvvc.hvc1">
        <EssentialProperty schemeIdUri="urn:mpeg:dash:preselection:2016" />
        <EssentialProperty
schemeIdUri="urn:mpeg:mpegI:v3c:2020:videoComponent">
            <v3c:videoComponent type="occp" alt_id ="2" tile_ids="1 2 3" />
        </EssentialProperty>
        <Representation>
            ...
        </Representation>
    </AdaptationSet>
    <AdaptationSet id="7" mimeType="video/mp4" codecs="resv.vvvc.hvc1">
        <EssentialProperty schemeIdUri="urn:mpeg:dash:preselection:2016" />
        <EssentialProperty
schemeIdUri="urn:mpeg:mpegI:v3c:2020:videoComponent">
            <v3c:videoComponent type="occp" alt_id ="2" tile_ids="4 5 6"/>
        </EssentialProperty>
        <Representation>
            ...
        </Representation>
    </AdaptationSet>
    <!-- Geometry -->
    <AdaptationSet id="8" mimeType="video/mp4" codecs="resv.vvvc.hvc1">
        <EssentialProperty schemeIdUri="urn:mpeg:dash:preselection:2016" />
        <EssentialProperty
schemeIdUri="urn:mpeg:mpegI:v3c:2020:videoComponent">
            <v3c:videoComponent type="geom" alt_id ="1" />
        </EssentialProperty>
        <Representation>
            ...
        </Representation>
    </AdaptationSet>
    <AdaptationSet id="9" mimeType="video/mp4" codecs="resv.vvvc.hvc1">
        <EssentialProperty schemeIdUri="urn:mpeg:dash:preselection:2016" />
        <EssentialProperty
schemeIdUri="urn:mpeg:mpegI:v3c:2020:videoComponent">
            <v3c:videoComponent type="geom" alt_id ="2" tile_ids="1 2 3" />
        </EssentialProperty>
        <Representation>
            ...
        </Representation>
    </AdaptationSet>
    <AdaptationSet id="10" mimeType="video/mp4" codecs="resv.vvvc.hvc1">
        <EssentialProperty schemeIdUri="urn:mpeg:dash:preselection:2016" />
        <EssentialProperty
schemeIdUri="urn:mpeg:mpegI:v3c:2020:videoComponent">
            <v3c:videoComponent type="geom" alt_id ="2" tile_ids="4 5 6"/>
        </EssentialProperty>
        <Representation>
            ...
        </Representation>
    </AdaptationSet>
    <!-- Attribute -->
    <AdaptationSet id="11" mimeType="video/mp4" codecs="resv.vvvc.hvc1">
        <EssentialProperty schemeIdUri="urn:mpeg:dash:preselection:2016" />
        <EssentialProperty
schemeIdUri="urn:mpeg:mpegI:v3c:2020:videoComponent">
            <v3c:videoComponent type="attr" alt_id="1" />
        </EssentialProperty>
        <Representation>
            ...
        </Representation>
    </AdaptationSet>
    <AdaptationSet id="12" mimeType="video/mp4" codecs="resv.vvvc.hvc1">
```

```
        <EssentialProperty schemeIdUri="urn:mpeg:dash:preselection:2016" />
        <EssentialProperty
schemeIdUri="urn:mpeg:mpegI:v3c:2020:videoComponent">
            <v3c:videoComponent type="attr" alt_id ="2" tile_ids="1 2 3" />
        </EssentialProperty>
        <Representation>
        ...
        </Representation>
    </AdaptationSet>
    <AdaptationSet id="13" mimeType="video/mp4" codecs="resv.vvvc.hvc1">
        <EssentialProperty schemeIdUri="urn:mpeg:dash:preselection:2016" />
        <EssentialProperty
schemeIdUri="urn:mpeg:mpegI:v3c:2020:videoComponent">
            <v3c:videoComponent type="attr" alt_id ="2" tile_ids="4 5 6"/>
        </EssentialProperty>
        <Representation>
        ...
        </Representation>
    </AdaptationSet>
    <!-- Atlas Tile Preselections -->
    <Preselection id="1" tag="1" preselectionComponents="2 6 9 12" codecs="v3t1">
        <!-V3C Descriptor -->
        <EssentialProperty schemeIdUri="urn:mpeg:mpegI:v3c:2020:v3c"
vId="1" />
    </Preselection>
    <Preselection id="2" tag="2" preselectionComponents="3 7 10 13" codecs="v3t1">
        <!-V3C Descriptor -->
        <EssentialProperty schemeIdUri="urn:mpeg:mpegI:v3c:2020:v3c"
vId="1" />
    </Preselection>
</Period>
</MPD>
```

For DASH MPD, v3c:@vId, v3c:@atlas_id and VideoComponent@atlas_id, the parameter indicating an alternative version of a V3C content carried by the adaptation set is present if multiple versions of same volumetric media are signalled in separate adaptation sets. For example, when V3C content alternatives are presented, video components associated to each versions of the are also signalled in separate adaptation sets. The atlas tracks are signalled in separate adaptation sets. For the atlas tile tracks not using atlas tile encoding, separate preselections including each of such atlas adaptation sets are defined to indicate the video component tracks associated with each atlas tracks. The atlas tile tracks using atlas tile encoding are not directly included in any preselection but the preselection for each atlas tile tracks are defined to indicate the video component tracks associated with each atlas tile tracks. Through the dependency relationship between the atlas tile track and the atlas track that comprises one of alternative representations of a V3C content, it can be known that the atlas tile tracks are part of one alternative representations of a V3C content indirectly.

This embodiment describes the case of two V3C contents in an alternative relationship as depicted in the FIG. 5C. There are thirteen adaptation sets. There are two atlas adaptation sets. The same value of @vID and @atlas_id is assigned to both atlas tracks as they are representing the same V3C content and are alternative to each other. As the tile track without atlas tile encoding and the tile track with atlas tile encoding are alternatives each other, the tile tracks are defined as individual adaptation sets and the same values are assigned for the @atlas_id attribute. Two atlas tile tracks are also defined as individual adaptation sets as they are alternatives each other. Component alternative relationship of the atlas tile adaptation sets are indicated by having same value of @dependencyId. All video component tracks associated with atlas tile tracks are defined as individual adaptation sets. Atlas tile preselection is used to indicate alternative relationship of video components associated each atlas tile tracks. Two preselections to indicate the video components for each atlas tile tracks are defined. As there are two atlas tracks with the same value of @vID and @atlas_id, the client can understand that there are two alternative versions of an V3C content. As one of the preselections includes one of the atlas adaptations set, the client can understand that such preselection defines one representation of the V3C content. As two preselection includes the atlas tile adaptation sets and the atlas tile adaptation sets are dependent on the atlas tile track, which is not part of any preselection, then the client can understand that such preselections are part of another representation of the V3C content using the atlas tile track.

```
<?xml version="1.0" encoding="UTF-8"?>
<MPD
    xmlns="urn:mpeg:dash:schema:mpd:2011"
    xmlns:v3c="urn:mpeg:mpegI:v3c:2020"
    type="static"
    mediaPresentationDuration="PT10S"
    minBufferTime="PT1S"
    profiles="urn:mpeg:dash:profile:isoff-on-demand:2011">
    <Period>
        <!-- Main V3C AdaptationSet 1 -->
        <AdaptationSet id="1" codecs="v3c1">
```

```
        <!-- V3C Descriptor -->
        <EssentialProperty schemeIdUri="urn:mpeg:mpegI:v3c:2020:v3c" vId="1"
atlas_id="1" />
        <Representation id="1">
            ...
        </Representation>
    </AdaptationSet>
    <!-- Main V3C AdaptationSet 2 -->
    <AdaptationSet id="2" codecs="v3c1">
        <!-- V3C Descriptor -->
        <EssentialProperty schemeIdUri="urn:mpeg:mpegI:v3c:2020:v3c" vId="1"
atlas_id="1"/>
        <Representation id="2">
            ...
        </Representation>
    </AdaptationSet>
    <!-- Atlas Tile Adaptation Set 1 -->
    <AdaptationSet id="3" codecs="v3t1">
        <EssentialProperty schemeIdUri="urn:mpeg:dash:preselection:2016" />
        <EssentialProperty schemeIdUri="urn:mpeg:mpegI:v3c:2020:v3c" tile_ids="1 2 3" />
        <Representation dependencyId="2">
            ...
        </Representation>
    </AdaptationSet>
    <!-- Atlas Tile Adaptation Set 2 -->
    <AdaptationSet id="4" codecs="v3t1">
        <EssentialProperty schemeIdUri="urn:mpeg:dash:preselection:2016" />
        <EssentialProperty schemeIdUri="urn:mpeg:mpegI:v3c:2020:v3c" tile_ids="4 5 6"/>
        <Representation dependencyId="2">
            ...
        </Representation>
    </AdaptationSet>
    <!-- Occupancy -->
    <AdaptationSet id="5" mimeType="video/mp4" codecs="resv.vvvc.hvc1">
        <EssentialProperty schemeIdUri="urn:mpeg:dash:preselection:2016" />
        <EssentialProperty schemeIdUri="urn:mpeg:mpegI:v3c:2020:videoComponent">
            <v3c:videoComponent type="occp" atlas_id="1"/>
        </EssentialProperty>
        <Representation>
            ...
        </Representation>
    </AdaptationSet>
    <AdaptationSet id="6" mimeType="video/mp4" codecs="resv.vvvc.hvc1">
        <EssentialProperty schemeIdUri="urn:mpeg:dash:preselection:2016" />
        <EssentialProperty schemeIdUri="urn:mpeg:mpegI:v3c:2020:videoComponent">
            <v3c:videoComponent type="occp" atlas_id="1" tile_ids="1 2 3" />
        </EssentialProperty>
        <Representation>
            ...
        </Representation>
    </AdaptationSet>
    <AdaptationSet id="7" mimeType="video/mp4" codecs="resv.vvvc.hvc1">
        <EssentialProperty schemeIdUri="urn:mpeg:dash:preselection:2016" />
        <EssentialProperty schemeIdUri="urn:mpeg:mpegI:v3c:2020:videoComponent">
            <v3c:videoComponent type="occp" atlas_id="1" tile_ids="4 5 6" />
        </EssentialProperty>
        <Representation>
            ...
        </Representation>
    </AdaptationSet>
    <!-- Geometry -->
    <AdaptationSet id="8" mimeType="video/mp4" codecs="resv.vvvc.hvc1">
        <EssentialProperty schemeIdUri="urn:mpeg:dash:preselection:2016" />
        <EssentialProperty schemeIdUri="urn:mpeg:mpegI:v3c:2020:videoComponent">
            <v3c:videoComponent type="geom" atlas_id="1"/>
        </EssentialProperty>
        <Representation>
            ...
        </Representation>
    </AdaptationSet>
    <AdaptationSet id="9" mimeType="video/mp4" codecs="resv.vvvc.hvc1">
        <EssentialProperty schemeIdUri="urn:mpeg:dash:preselection:2016" />
        <EssentialProperty schemeIdUri="urn:mpeg:mpegI:v3c:2020:videoComponent">
            <v3c:videoComponent type="geom" atlas_id="1" tile_ids="1 2 3" />
        </EssentialProperty>
        <Representation>
            ...
        </Representation>
    </AdaptationSet>
```

```xml
<AdaptationSet id="10" mimeType="video/mp4" codecs="resv.vvvc.hvc1">
    <EssentialProperty schemeIdUri="urn:mpeg:dash:preselection:2016" />
    <EssentialProperty schemeIdUri="urn:mpeg:mpegI:v3c:2020:videoComponent">
        <v3c:videoComponent type="geom" atlas_id="1" tile_ids="4 5 6" />
    </EssentialProperty>
    <Representation>
    ...
    </Representation>
</AdaptationSet>
<!-- Attribute -->
<AdaptationSet id="11" mimeType="video/mp4" codecs="resv.vvvc.hvc1">
    <EssentialProperty schemeIdUri="urn:mpeg:dash:preselection:2016" />
    <EssentialProperty schemeIdUri="urn:mpeg:mpegI:v3c:2020:videoComponent">
        <v3c:videoComponent type="attr" atlas_id="1" tile_ids="4 5 6" />
    </EssentialProperty>
    <Representation>
    ...
    </Representation>
</AdaptationSet>
<AdaptationSet id="12" mimeType="video/mp4" codecs="resv.vvvc.hvc1">
    <EssentialProperty schemeIdUri="urn:mpeg:dash:preselection:2016" />
    <EssentialProperty schemeIdUri="urn:mpeg:mpegI:v3c:2020:videoComponent">
        <v3c:videoComponent type="attr" atlas_id="1" tile_ids="1 2 3" />
    </EssentialProperty>
    <Representation>
    ...
    </Representation>
</AdaptationSet>
<AdaptationSet id="13" mimeType="video/mp4" codecs="resv.vvvc.hvc1">
    <EssentialProperty schemeIdUri="urn:mpeg:dash:preselection:2016" />
    <EssentialProperty schemeIdUri="urn:mpeg:mpegI:v3c:2020:videoComponent">
        <v3c:videoComponent type="attr" atlas_id="1" tile_ids="4 5 6" />
    </EssentialProperty>
    <Representation>
    ...
    </Representation>
</AdaptationSet>
<!-- Atlas Tile Preselections -->
<Preselection id="1" tag="1" preselectionComponents="1 5 8 11" codecs="v3c1">
    <!-V3C Descriptor -->
    <EssentialProperty schemeIdUri="urn:mpeg:mpegI:v3c:2020:v3c" vId="1" atlas_id="1"/>
</Preselection>
<Preselection id="2" tag="2" preselectionComponents="3 6 9 12" codecs="v3t1">
    <!-V3C Descriptor -->
    <EssentialProperty schemeIdUri="urn:mpeg:mpegI:v3c:2020:v3c" vId="1" atlas_id="1"/>
</Preselection>
<Preselection id="3" tag="3" preselectionComponents="4 7 10 13" codecs="v3t1">
    <!-V3C Descriptor -->
    <EssentialProperty schemeIdUri="urn:mpeg:mpegI:v3c:2020:v3c" vId="1" atlas_id="1"/>
</Preselection>
</Period>
</MPD>
```

Although FIGS. 5A through 5C illustrate files 500, 502, 504, various changes may be made to FIGS. 5A through 5C. For example, the sizes, shapes, and dimensions of the files 500, 502, 504 and each file's individual components can vary as needed or desired. Also, the number and placement of various components of the files 500, 502, 504 can vary as needed or desired. In addition, the files 500, 502, 504 may be used in any other suitable media processing process and is not limited to the specific processes described above.

Figure 6:
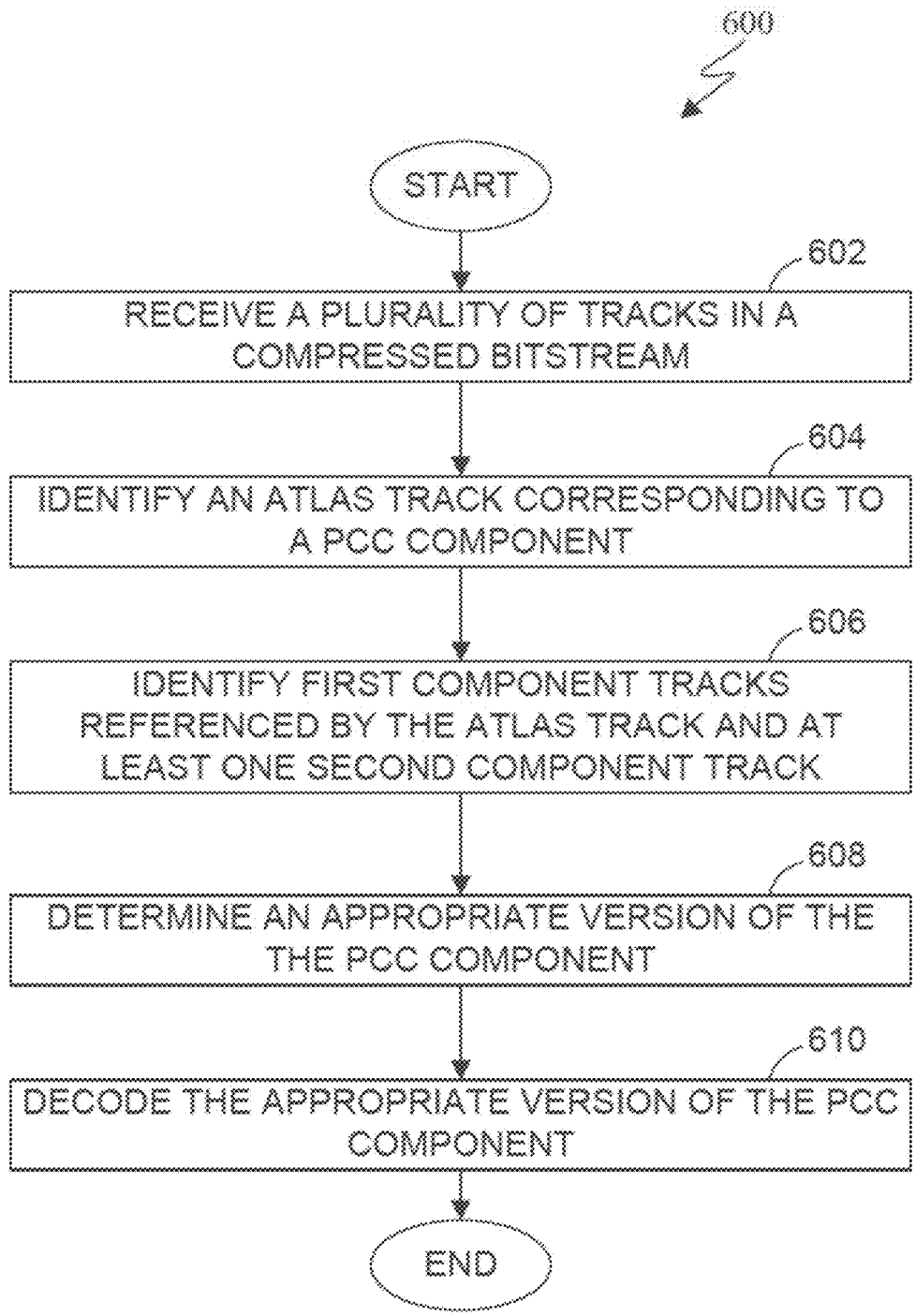
FIG. 6 illustrates an example method for V3C video component track alternatives according to this disclosure.

FIG. 6 illustrates an example method 600 for V3C video component track alternatives according to this disclosure. For ease of explanation, the method 600 of FIG. 6 is described as being performed using the electronic device 300 of FIG. 3. However, the method 600 may be used with any other suitable system and any other suitable electronic device.

As shown in FIG. 6, the electronic device 300 can receive a plurality of tracks in a compressed bitstream at step 602. The plurality of tracks can be received from an internal storage, such as memory 360. The plurality of tracks can also be received wirelessly through a transceiver, such as transceiver 310. The plurality of tracks can be received directly from an external device through an input, such as input 350.

The electronic device 300 identifies an atlas track 506 corresponding to a PCC component at step 604. The atlas track 506 can be a first track in a file 500. The electronic device 300 can identify information in an atlas track that corresponds to the PCC component required for display to the user.

The electronic device 300 identifies a set of first component tracks that is referenced by the atlas track and at least one second component tracks, where each of the at least one second component track is an alternative version of a first component track of the set of first component tracks at step 606. The atlas track 506 can include information that references one or more component tracks for PCC content. The at least one second component tracks are not directly referenced by the atlas track but have an indicator that matches one of the first component tracks. The indicator could be an alternate track value. Multiple tracks (more than two) could include the same alternate track value. Each of the tracks with the alternate track value or alternatives for the PCC component. Other information included in the alternative component tracks can be used to indicate a suitable version of the PCC component. For example, each of the alternative component tracks could include an original format value. The PCC component could use the original format value to determine the suitable version of the PCC component based on the encoding type.

Alternative component tracks could be included under alternative atlas tracks. Atlas tracks with a same alternate group value could indicate different versions of the same object, encoded similarly or differently. In other words, a PCC component could have characteristics that are different other than the encoding type. The alternate components could be different colors, orientations, etc.

The electronic device 300 determines which of the set of first component tracks and the at least one second component track are appropriate versions of the PCC component at step 608. The electronic device 300 can determine the appropriate version based on the characteristics of the decoder, the requirements from the user, etc. The appropriate version is indicated through one or more of the values in the component track.

The electronic device 300 decodes the appropriate version of the PCC component from among the set of first component tracks and the at least one second component track at step 610. The electronic device 300 decodes only the appropriate version of the PCC component, without processing any other of the alternative component tracks, alternative atlas tracks, or alternative atlas tile tracks. The PCC component can then be display appropriately to a user.

Although FIG. 6 illustrates one example of a method 600 for V3C video component track alternatives, various changes may be made to FIG. 6. For example, while shown as a series of steps, various steps in FIG. 6 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A decoding device for visual volumetric video-based coding (V3C) video component track alternatives, the decoding device comprising:
   a communication interface configured to receive a plurality of tracks in a compressed bitstream; and
   a processor operably coupled to the communication interface, wherein the processor is configured to:
      identify an atlas track corresponding to a point cloud compression (PCC) component;
      identify a set of first component tracks that is referenced by the atlas track and at least one second component track, each of the at least one second component track is an alternative version of a first component track of the set of first component tracks;
      determine which of the set of first component tracks and the at least one second component track are appropriate versions of the PCC component; and
      decode the appropriate version of the PCC component from among the set of first component tracks and the at least one second component track,
   wherein only the set of first component tracks, among the set of first component tracks and the at least one second component track, is directly referenced by the atlas track.

2. The decoding device of claim 1, wherein, to identify the at least one second component track, the processor is further configured to identify component tracks that have a same alternative group value.

3. The decoding device of claim 1, wherein, to identify the at least one second component track, the processor is further configured to identify component tracks that have a same value of an atlas ID.

4. The decoding device of claim 1, wherein:
   the alternative version is a differently encoded representation of the PCC component, and
   the set of first component tracks and the at least one second component track respectively have information about a codec used for the PCC component.

5. The decoding device of claim 1, wherein the compressed bitstream further includes an atlas tile track that is referenced by the atlas track, and only the set of first component tracks, among the set of first component tracks and the at least one second component track, is directly referenced by the atlas tile track.

6. The decoding device of claim 1, wherein:
   the compressed bitstream includes a second atlas track with a same alternative group value to the atlas track, and
   the same alternative group value indicates that the second atlas track represents an alternative version of the PCC component.

7. The decoding device of claim 6, wherein a third component track is referenced by the second atlas track and is an alternative to the first component track and the second component track.

8. A method for visual volumetric video-based coding (V3c) video component track alternatives, the method comprising:
   receiving a plurality of tracks in a compressed bitstream; and
   identifying an atlas track corresponding to a point cloud compression (PCC) component;
   identifying a set of first component tracks that is referenced by the atlas track and at least one second component track, each of the at least one second component track is an alternative version of a first component track of the set of first component tracks;
   determining which of the set of first component tracks and the at least one second component track are appropriate versions of the PCC component; and
   decoding the appropriate version of the PCC component from among the set of first component tracks and the at least one second component track,
   wherein only the set of first component tracks, among the set of first component tracks and the at least one second component track, is directly referenced by the atlas track.

9. The method of claim 8, wherein, identifying the at least one second component track, comprises identifying component tracks that have a same alternative group value.

10. The method of claim 8, wherein identifying the at least one second component track comprises identifying component tracks that have a same value of an atlas ID.

11. The method of claim 8, wherein:
the alternative version is a differently encoded representation of the PCC component, and
the set of first component tracks and the at least one second component track respectively have information about a codec used for the PCC component.

12. The method of claim 8, wherein the compressed bitstream further includes an atlas tile track that is referenced by the atlas track, and only the set of first component tracks, among the set of first component tracks and the at least one second component track, is directly referenced by the atlas tile track.

13. The method of claim 8, wherein:
the compressed bitstream includes a second atlas track with a same alternative group value to the atlas track, and
the same alternative group value indicates that the second atlas track represents an alternative version of the PCC component.

14. The method of claim 13, wherein a third component track is referenced by the second atlas track and is an alternative to the first component track and the second component track.

15. An encoding device for visual volumetric video-based coding (V3c) video component track alternatives, the encoding device comprising:
a processor operably configured to:
encode an atlas track corresponding to a point cloud compression (PCC) component;
encode the PCC component in a first component track that references the atlas track; and
encode an alternative version of the PCC component from the first component track in a second component track; and
a communication interface operably coupled to the processor, the communication interface configured to transmit a compressed bitstream including the atlas track, the first component track, and the second component track,
wherein only the first component track, of the first component track and the second component track, is referenced by the atlas track.

16. The encoding device of claim 15, wherein the first component track and the second component track are assigned with a same alternative group value.

17. The encoding device of claim 15, wherein the first component track and the second component track are differently encoded representations of the PCC component.

18. The encoding device of claim 15, wherein:
the processor is further configured to encode an atlas tile track that is referenced by the atlas track, and
only the first component track, of the first component track and the second component track, directly referenced by the atlas tile track.

19. The encoding device of claim 15, wherein the processor is further configured to:
encode a second atlas track with a same alternative group value to the atlas track, and
encode a third component track that is referenced by the second atlas track and is an alternative to the first component track and the second component track.

20. The encoding device of claim 19, wherein the same alternative group value indicates that the second atlas track represents an alternative version of the PCC component.

* * * * *